United States Patent
Fang et al.

(10) Patent No.: US 10,959,067 B1
(45) Date of Patent: Mar. 23, 2021

(54) METHOD AND SYSTEM FOR SENSING-DATA COLLECTION AND TRANSPORT FROM MINIMIZATION-OF-DRIVE-TESTS DEVICE

(71) Applicant: Sprint Communications Company L.P., Overland Park, KS (US)

(72) Inventors: Zheng Fang, McLean, VA (US); Matthew J. Starzec, Leesburg, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 16/442,362

(22) Filed: Jun. 14, 2019

(51) Int. Cl.
*H04W 72/12* (2009.01)
*H04W 4/38* (2018.01)

(52) U.S. Cl.
CPC .................................. *H04W 4/38* (2018.02)

(58) Field of Classification Search
CPC ... H04W 24/10; H04W 28/12; H04W 40/005; H04W 40/244; H04W 40/32; H04W 4/38; H04W 84/18; H04W 84/20; H04W 8/02; H04W 88/08; H04W 88/16; H04W 92/02; H04W 8/245
See application file for complete search history.

(56) References Cited

U.S. PATENT DOCUMENTS

| | | |
|---|---|---|
| 8,830,968 B2 | 9/2014 | Lin et al. |
| 9,877,213 B1 | 1/2018 | Wang et al. |
| 9,912,547 B1 | 3/2018 | Douberley et al. |
| 2011/0092186 A1* | 4/2011 | Krco ............... H04L 65/1059 455/411 |
| 2013/0084888 A1 | 4/2013 | Johansson et al. |
| 2015/0195730 A1* | 7/2015 | Siomina ............ H04W 24/08 370/252 |

(Continued)

FOREIGN PATENT DOCUMENTS

| | | |
|---|---|---|
| CN | 104219695 A | 12/2014 |
| WO | 2014018052 A1 | 1/2014 |

OTHER PUBLICATIONS

Lee, Yann-Hang, et al. "A Smart Gateway Framework for IOT Services", 2016 IEEE International Conference on Internation of Things (iThings) and IEEE Green Computing and Communications, Retrieved Mar. 18, 2019, https://ieeexplore.ieee.org/document/7917072.

(Continued)

*Primary Examiner* — Quan M Hua

(57) ABSTRACT

A method for providing data to a user comprising communicating, from a radio access network to a Minimization of Drive Tests ("MDT")-channel-communicative sensor device, at least one MDT signal selected from the group consisting of an MDT configuration signal and an MDT control signal. The method also comprises generating, at least in part in response to the MDT signal and using an onboard sensor of the MDT-channel-communicative sensor device, sensor data comprising non-MDT data. The method also comprises receiving at least a portion of the sensor data into the radio access network over an MDT channel and communicating at least the portion of the sensor data from the radio access network to the user.

13 Claims, 6 Drawing Sheets

(56) References Cited

U.S. PATENT DOCUMENTS

2016/0037371 A1 2/2016 Rácz et al.
2019/0007246 A1 1/2019 Fertonani et al.

OTHER PUBLICATIONS

McClelland, Calum, "What is an IoT Gateway?—A Simple Explanation", IoT For All Jan. 6, 2019, https://www.iotforall.com/what-is-a-gateway/, retrieved Mar. 18, 2019.

Jung, SungHoon, et al., "Minimzation of Driving Test (MDT)", Radio Protocols for LTE and LTE-Advanced, https://www.oreilly.com/library/view/radio-protocols-for/9781118188568/chapter14.html, retrieved Apr. 13, 2019.

Sequeira, Neil, "What 5G Means for the Future of Internet of Things", Jan. 11, 2019, https://www.ecnmag.com/blog/2019/01/what-5g-means-future-internet-things, retrieved Aug. 21, 2019.

Ejaz, Waleed, et al., "Internet of Things (IoT) in 5G Wireless Communications", IEEE Access, vol. 4 2016, pp. 10310-10314.

"Analysis of CPRI Signals at Fibre-based Mobile Transmission Sites", Livingstone UK Limited, Jan. 15, 2015, http:/www.epdtonthenet.net/article/88832/Analtsis-of-CPRI-signals-at-fibre-based-mobile-transmission-sites.aspx.

"Its Time to Unleash MDT!!" Mar. 8, 2016, Empirix Blog, https://blog.empirix.com/its-time-to-unleash-mdt/ retrieved Apr. 13, 2019.

Panigrahi, Prashant, "Minimization of Drive Test Requirements Analysis", Jan. 31, 2012, 3GLTEInfo, www.3glteinfo.com/minimzation-of-drive-test-requirements-analysis/, retrieved Apr. 13, 2019.

Baumann, Daniel, "Minimazation of Drive Tests (MDT) in Mobile Communication Networks", Network Architectures and Services, Mar. 2014, pp. 9-16.

"Designing Remote Radio Head Applications with FPGAs" Altera, 2012, Altera Framework Components, http://www.altera.com.

"Minimization of Drive Tests (MDT) in 3GPP Release-10", Dec. 9, 2010, The 3G4G Blog, https:/blog.3g4g.co.uk/2010/12/minimization-of-drive-tests-mdt-in-3gpp.html, retrieved Apr. 13, 2019.

"Universal Mobile Telecommunication System (UMTS); LTE; Universal Terrestrial RAdio Access (UTRA) and Evolved Universal Terrestrial Radio Access (E-UTRA); Radio measurement collection for Minimization of Drive Tests (MDT); Overall description; Stage 2", ETSI European telecommunications Standards Institute 2014, http://www.etsi.org.

\* cited by examiner

METHOD AND SYSTEM FOR SENSING-DATA COLLECTION AND TRANSPORT FROM MINIMIZATION-OF-DRIVE-TESTS DEVICE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Historically, drive testing (or a "drive test," or "DT") has involved loading radio frequency ("RF") test equipment into a car, truck, or other vehicle, driving the vehicle around and about a cellular communication network service area, and operating the test equipment to assess the performance of the network at various different locations. Drive testing has been expensive and time consuming. To reduce the burdens of drive testing, the 3rd Generation Partnership Project ("3GPP") has promulgated Minimization of Drive Tests ("MDT") standards. These standards, namely, the 3GPP TS 37.320 version 12.2.0 Release 12 a/k/a ETSI TS 137 320 V12.2.0 (2014-09) technical specification and all documents referenced therein, are incorporated by reference as if fully set forth herein. As used herein, the term "MDT data" means data specified in the MDT standards for use in MDT, while data not so specified is herein referred to as "non-MDT data."

For MDT, cellular-communicative user equipment ("UE") associated with a cellular communication network may collect some of the MDT data. Further, MDT provides a bi-directional logical communication channel ("MDT channel") between such UE and an associated cell site or other radio access network ("RAN"). Over the MDT channel, the RAN may transmit MDT configuration and/or control signals to the UE, and the UE may transmit MDT data to the RAN.

SUMMARY

A method for providing data to a user is disclosed. The method comprises communicating, from a radio access network to a Minimization of Drive Tests ("MDT")-channel-communicative sensor device, at least one MDT signal selected from the group consisting of an MDT configuration signal and an MDT control signal; generating, at least in part in response to the MDT signal and using an onboard sensor of the MDT-channel-communicative sensor device, sensor data comprising non-MDT data; receiving at least a portion of the sensor data into the radio access network over an MDT channel; and communicating at least the portion of the sensor data from the radio access network to the user.

In another embodiment, a method for providing data to a user is disclosed. The method comprises communicating, from a radio access network to a first cellular-communicative UE device, at least one MDT signal selected from the group consisting of an MDT configuration signal and an MDT control signal; receiving sensor data comprising non-MDT data into the first cellular-communicative UE device over at least one wireless communication link selected from the group consisting of a Wi-Fi link, a Bluetooth link, an NFC link, a LoRa link, and an infrared link; communicating at least a portion of the sensor data from the first cellular-communicative UE device to the radio access network over an MDT channel; and communicating at least the portion of the sensor data from the radio access network to the user.

In another embodiment, a system for providing data to a user is disclosed. The system comprises a radio access network configured to receive, over an MDT channel, sensor data comprising non-MDT data; and an MDT-channel-communicative sensor device communicatively coupled to the radio access network. The MDT-channel-communicative sensor device includes equipment selected from the group consisting of a cellular-communicative UE device configured to receive the sensor data over at least one wireless communication link selected from the group consisting of a Wi-Fi link, a Bluetooth link, an NFC link, a LoRa link, and an infrared link, and a first radio-head-mounted sensor device configured to generate the sensor data.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
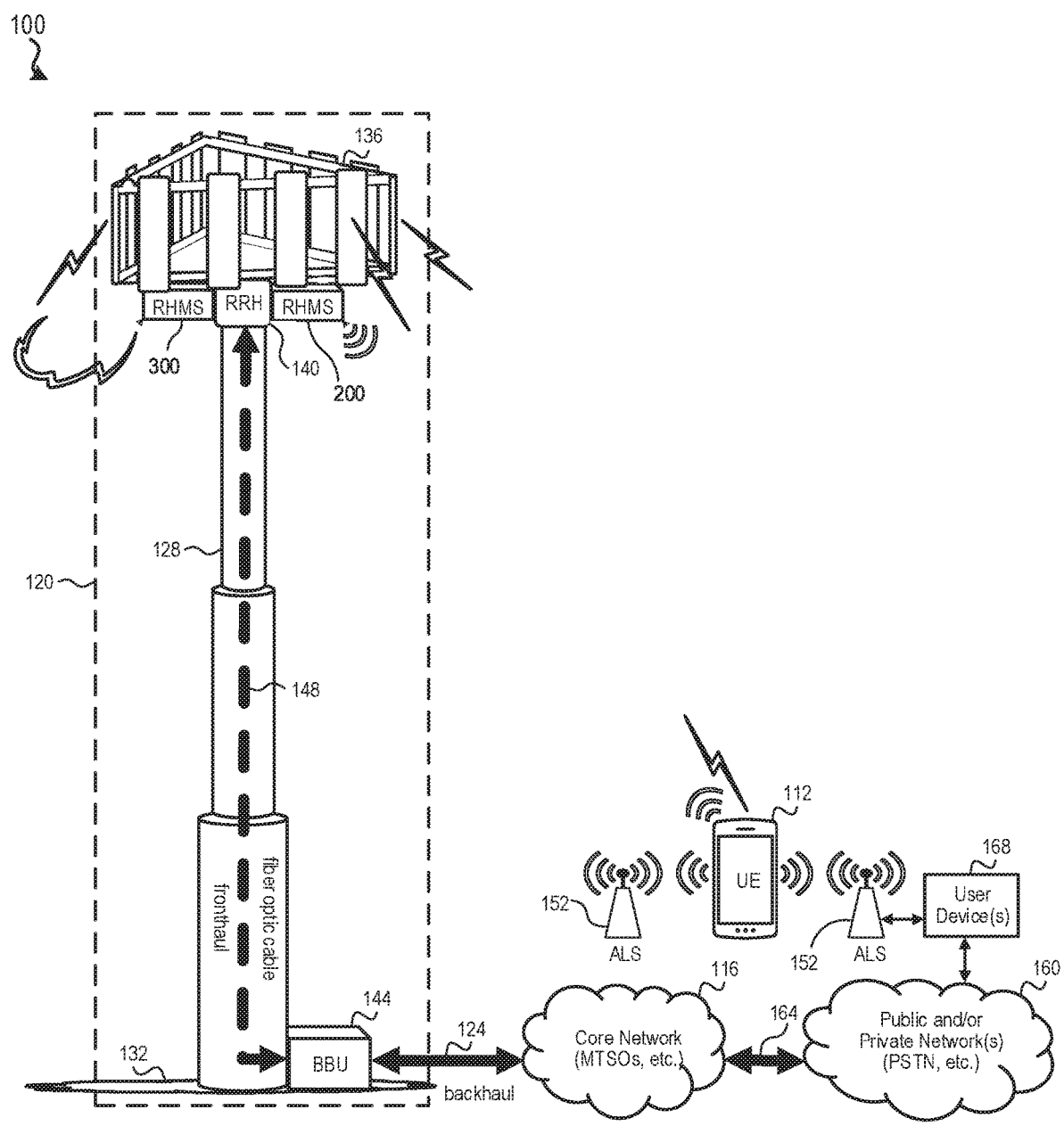
FIG. 1 depicts a system for sensing-data collection and transport according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

As cellular communication coverage continues to grow and technologies continue to develop from 3G to 5G (and beyond), sophisticated offerings such as weather reporting and forecasting, public safety alerts and information, traffic information, and others are becoming increasingly desirable to consumers of cellular communication services. Such offerings are increasingly dependent on data from various sensors embedded in mobile phones, Internet of Things ("IoT") devices, and in other devices. Non-limiting examples of such sensors include accelerometers, gyroscopes, photometers, proximity sensors, fingerprint readers, cameras, microphones, magnetometers, temperature sensors, humidity sensors, wind speed sensors, water level sensors, natural gas ("CH4") concentration sensors, carbon dioxide ("$CO_2$") concentration sensors, ozone ("$O_3$") concentration sensors, volatile organic chemical ("VOC") concentration sensors, and particulate matter level sensors. As the number of such sensors deployed around the world grows, reliably acquiring and transporting the ever increasing amounts of corresponding sensor data into and through cellular communication networks is becoming more and more challenging. The inventors have recognized that an MDT channel can (in addition to supporting MDT) support the acquisition and transport of such additional sensor data.

As used herein, the terms "MDT-channel-communicative sensor," "MDT-channel-communicative sensor device," and inflections thereof mean any device that is configured to, at least: sense and/or observe one or more environmental conditions, parameters, characteristics, and/or other aspects of its surroundings other than or in addition to location and/or time; transmit non-MDT data corresponding to such sensor data over an MDT channel; receive MDT configuration and/or control signals over the MDT channel; and respond to the MDT configuration and/or control signals. As described herein, one or more such UE devices and/or one or more other MDT-channel-communicative sensor devices can advantageously transport such sensor data to one or more associated cell sites or other radio access networks ("RANs") over one or more respective MDT channels.

In some embodiments, suitable sensor data may be generated (onboard) by one or more UE devices themselves. In some embodiments, suitable sensor data may be generated by one or more Internet of Things ("IoT") sensors or one or more other external sensors, with the UE receiving such (off-board generated) sensor data from the one or more external sensors over one or more suitable wireless or wired communication links and then forwarding the sensor data to the associated radio access network ("RAN") over the respective MDT channel. In some embodiments, one or more suitable sensors are embedded in an MDT-channel-communicative sensor device that plugs into a remote radio head ("RRH") component of the RAN. In some embodiments, the UE may buffer the sensor data and/or defer the collection and/or transmission of the sensor data over the MDT channel during voice communication sessions and/or other operations of high layer processes. In some embodiments, the UE may add to, combine, compress, and/or otherwise process the sensor data before transmitting the sensor data and/or the processed sensor data to the RAN.

At the RAN, the sensor data and/or the processed sensor data may flow (through a fronthaul) from the RRH to a baseband unit ("BBU"). The BBU may be modified to use some or all of the sensor data and/or the processed sensor data locally, and/or may send (through a backhaul) some or all of the sensor data and/or the processed sensor data to a trace collection entity ("TCE") and/or other suitable component of a core network. The core network may provide a sensing as a network service ("SAaNS") that processes the sensor data and/or the processed sensor data and makes the sensor data and/or the processed sensor data available to one or more users of the SAaNS.

It should be appreciated that advantages of the disclosure include, for some embodiments, abilities to collect data from a wide array of sensors using a lower layer process of a RAN, with limited competition for higher layer process bandwidth. It should also be appreciated that additional advantages of the disclosure include, for some embodiments, constantly powered sensors (without a need for batteries in the sensors), ease of sensor deployment (with little or no additional zoning or leasing requirements), scalable sensor deployment, and/or capabilities to dynamically enable, disable, and/or reconfigure sensors.

As used herein, the term "communicate" and inflections thereof mean to receive and/or transmit data or information over a communication link. The communication link may include both wired and wireless links, and may comprise a direct link or may comprise multiple links passing through one or more communication networks or network devices such as, but not limited to, routers, firewalls, servers, and switches. The communication networks may comprise any type of wired or wireless network. The networks may include private networks and/or public networks such as the Internet. Additionally, in some embodiments, the term communicate may also encompass internal communication between various components of a system and/or with an external input/output device such as a keyboard or display device. Also, a "module" as referenced herein comprises one or more hardware or electrical components such as electrical circuitry, processors, and memory that may be specially configured to perform a particular function. The memory may comprise volatile memory and/or non-volatile memory that stores data such as, but not limited to, computer executable instructions, machine code, and other various forms of data. The module may be configured to use the data to execute one or more instructions to perform one or more tasks. In certain instances, a module may also refer to a particular set of functions, software instructions, or circuitry that is configured to perform a specific task. For example, a module may comprise software components such as, but not limited to, data access objects, service components, user interface components, application programming interface ("API") components; hardware components such as electrical circuitry, processors, and memory; and/or a combination thereof. As referenced herein, computer executable instructions may be in any form including, but not limited to, machine code, assembly code, scripts, and high-level programming code written in any programming language.

FIG. 1 depicts a system 100 for sensing-data collection and transport according to an embodiment of the disclosure. It should be appreciated that one or more components of the system 100 may be configured to, among other things, perform one or more steps of the method 400 (see FIG. 4) for sensing-data collection and transport according to an embodiment of the disclosure. It should also be appreciated that one or more components of the system 100 may be configured to, among other things, perform one or more steps of the method 500 (see FIG. 5) for sensing-data collection and transport according to an embodiment of the disclosure. The illustrated system 100 includes one or more cellular-communicative user equipment devices ("UE") 112, a core network 116 (e.g., a mobile telephone switching office ("MTSO")), a cell site 120, and a backhaul 124. The backhaul 124 communicatively couples the core network 116 to the cell site 120. Other embodiments of the system 100 may comprise any number of the UE 112, any number of the cell site 120, and any number of the backhaul 124.

Each of the UE 112 is configured to wirelessly communicate with the cell site 120 according to one or more of a long term evolution ("LTE"), code division multiple access ("CDMA"), global system for mobile communication ("GSM"), worldwide interoperability for microwave access ("WiMAX") telecommunication, and/or one or more other suitable telecommunication protocols. In the illustrated system 100, one or more of the UE 112 is also an MDT-channel-communicative sensor device, and one or more of the UE 112 is also configured to communicate with one or more other devices over a Wi-Fi, Bluetooth, Near Field Communication ("NFC"), LoRa, infrared, or other suitable wireless communication link(s). Non-limiting examples of the UE 112 include a mobile phone, a smart phone, a personal digital assistant ("PDA"), a wearable computer, a headset computer, a laptop computer, a tablet computer, or a notebook computer.

The cell site 120 is configured to, among other things, operate as a radio access network ("RAN") between the UE 112 and the backhaul 124. Thus, it should be appreciated that the cell site 120 and the backhaul 124 (together, in combination) communicatively couple the UE 112 to the core network 116. In the illustrated system 100, the cell site 120 includes a tall structure 128 and, more particularly, the structure 128 comprises a tower. The structure 128 extends upwardly and approximately vertically from a ground level 132 to a height of about 150 feet above the ground level 132. In other embodiments, the structure 128 may comprise a mast, a building, or any other suitable support member. The cell site 120 also includes an array antenna 136. The array antenna 136 is located atop the structure 128.

The cell site 120 also includes a remote radio head ("RRH") 140, a radio-head-mounted sensor ("RHMS") 200 attached to the RRH 140, a radio-head-mounted sensor ("RHMS") 300 attached to the RRH 140, a baseband unit ("BBU") 144, and a fronthaul 148. The fronthaul 148 communicatively couples the RRH 140 to the BBU 144. In the illustrated system 100, the fronthaul 148 comprises a fiber optic cable. In other embodiments, the fronthaul 148 may comprise a coaxial cable and/or other electrical wire, a wireless RF coupling, a wireless infrared coupling, and/or any other suitable communicative coupling.

In the illustrated system 100, the RRH 140 is attached to the structure 128 such that the RRH 140 is located at least 100 feet above the ground level 132 and not more than 25 feet away from the array antenna 136. The RRH 140 is configured to, among other things, receive electrical power from a 48V DC or other suitable power supply (not shown) and to operate as a digital-to-analog and analog-to-digital transceiver interface between the fronthaul 148 and the array antenna 136. In the illustrated system 100, the RRH 140 is configured to optically transmit and receive the digital signals to/from the BBU 144 through the fronthaul 148 according to the Common Public Radio Interface ("CPRI") protocol. In other embodiments, the RRH 140 may be configured to optically transmit and receive the digital signals to/from the BBU 144 through the fronthaul 148 according to the Open Base Station Architecture Initiative ("OBSAI") protocol. In other embodiments, the RRH 140 maybe configured to transmit and receive the digital signals to/from the BBU 144 through the fronthaul 148 in a wireless, electrically-wired, or other suitable manner and according to Wi-Fi, Bluetooth, NFC, LoRa, infrared, USB, RS-232, RS-422, Ethernet, or any other suitable protocol. The RRH 140 is also configured to mate with a power connector 230 of the RHMS 200 (described further below) such that the power connector 230 plugs into the RRH 140. The RRH 140 is also configured to convey sufficient electrical power to the power connector 230 for operating the RHMS 200. The RRH 140 is also configured to mate with a power connector 330 of the RHMS 300 (described further below) such that the power connector 330 plugs into the RRH 140. The RRH 140 is also configured to convey sufficient electrical power to the power connector 330 for operating the RHMS 300.

In the illustrated system 100, the BBU 144 is located closer to the ground level 132 than the RRH 140. The BBU 144 is configured to, among other things, demodulate and decode voice and data transmissions received from the core network 116 through the backhaul 124 and in turn transmit corresponding digital baseband signals to the RRH 140 through the fronthaul 148, and is configured to modulate and encode digital baseband voice and data transmissions received from the RRH 140 through the fronthaul 148 and in turn send corresponding transmissions to the core network 116 through the backhaul 124. In the illustrated system 100, the BBU 144 is also configured to transmit and receive the digital signals to/from the RRH 140 through the fronthaul 148 in a like manner (optical, wireless, electrically-wired, etc.) and according to a like protocol (CPRI, OBSAI, Ethernet, etc.) as the manner and protocol, respectively, by which the RRH 140 transmits and receives digital signals to the BBU 144 through the fronthaul 148.

The system 100 also includes one or more at large sensor devices ("ALS") 152. Each of the ALS 152 may be located practically anywhere. In some embodiments, a plurality of the ALS 152 may be disbursed over a wide geographical area. In the illustrated system 100, each of the ALS 152 is stationary. Nevertheless, in some embodiments one or more of the ALS 152 may be self-propelled, handheld, transported on or in a vehicle, or otherwise mobile. In the illustrated system 100, each of the ALS 152 comprises an IoT device configured to sense and/or observe one or more environmental conditions, parameters, characteristics, and/or other aspects of its surroundings and configured to transmit corresponding sensor data to one or more of the UE 112 over a Wi-Fi communication link. In other embodiments, each of the ALS 152 may comprise any other suitable device or combination of devices configured to generate such sensor data and configured to transmit the sensor data to one or more of the UE 112 over one or more Wi-Fi, Bluetooth, NFC, LoRa, infrared, and/or other suitable wireless communication link(s).

The system 100 also includes one or more public and/or private networks 160 (e.g., the public switched telephone network ("PSTN"), the Internet, private enterprise networks, home networks, etc.) and one or more additional communication links 164. The one or more additional communication links 164 communicatively couple the core network 116 to the one or more public and/or private networks 160.

The system 100 also includes one or more non-cellular-communicative user devices 168. Each of the devices 168 is any type of electronic device that may be used by a user to interact with the one or more public and/or private networks 160 without necessarily doing so through the core network 116. Non-limiting examples of the user devices 168 include plain old telephone system devices, digital subscriber line ("DSL") telephone system devices, and internet protocol ("IP") communicative computers and terminals.

Figure 2:
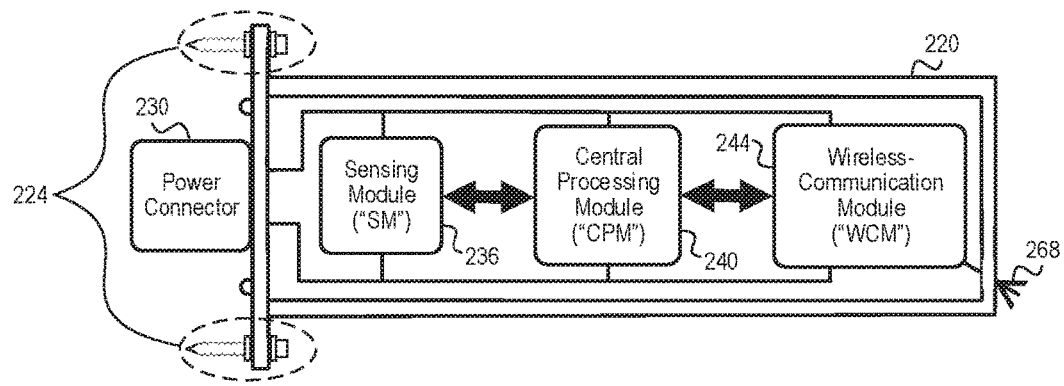
FIG. 2 depicts a layout for a radio-head-mounted sensor according to an embodiment of the disclosure.

FIG. 2 depicts a layout for the RHMS 200 according to an embodiment of the disclosure. The RHMS 200 is configured to, among other things, sense and/or observe one or more environmental conditions, parameters, characteristics, and/or other aspects of its surroundings, and is configured to transmit corresponding sensor data to one or more of the UE 112 over a wireless communication link. In some embodiments, the RHMS 200 may be implemented as a suitably modified IoT device. The RHMS 200 includes a housing 220, mounting hardware 224, the power connector 230, a sensing module 236, a central processing module 240, a wireless-communication module 244, and a suitable antenna 268.

The housing 220 is configured to be securely attached to the RRH 140 (the RRH 140 is not depicted in FIG. 2, but see FIG. 1) by the mounting hardware 224. The housing 220 is also configured to meet or exceed National Electrical Manufacturers Association ("NEMA") level 4 electrical enclosure standards and to meet or exceed IEEE 1613 environmental and testing requirements. The housing 220 accommodates the sensing module 236, the central processing module 240, and the wireless-communication module 244 such that the sensing module 236 may operably sense and/or observe one or more environmental conditions, parameters, characteristics, and/or other aspects of its surroundings. The power connector 230 is attached to the housing 220 such that power connector 230 may be operably coupled to the RRH 140 (the RRH 140 is not depicted in FIG. 2, but see FIG. 1). More particularly, the power connector 230 is attached to the housing 220 such that power connector 230 extends from the housing 220 as a male electrical coupling member (i.e., "an electrical plug"). The antenna 268 extends from the housing 220 such that the antenna 268 may operably transmit and receive wireless-communication signals.

The sensing module 236 is communicatively coupled to the central processing module 240. The sensing module 236 is configured to sense and/or observe one or more environmental conditions, parameters, characteristics, and/or other aspects of its surroundings and is configured to transmit corresponding sensor data to the central processing module 240. The central processing module 240 is also communicatively coupled to the wireless-communication module 244. The central processing module 240 is configured to operate as an interface between the sensing module 236 and the wireless-communication module 244.

The wireless-communication module 244 is communicatively coupled to the antenna 268. In the illustrated RHMS 200, the wireless-communication module 244 is configured to transmit (through the antenna 268) the sensor data to one or more of the UE 112 over a Wi-Fi communication link. In other embodiments, the wireless-communication module 244 may be configured to transmit (through the antenna 268) the sensor data to one or more of the UE 112 over a Bluetooth, NFC, LoRa, infrared, and/or other suitable wireless communication link(s).

Additionally, the sensing module 236, the central processing module 240, and the wireless-communication module 244 are operably coupled to the connector 230 to receive power through the connector 230, and are configured to operate using that power. Also, it should be appreciated that the sensing module 236, the central processing module 240, and the wireless-communication module 244 may be implemented using an embodiment of the computer system 600 (the computer system 600 is not depicted in FIG. 2, but see FIG. 6). For example, in such embodiments the sensing module 236 may comprise a suitable one or more of the I/O devices 650, the central processing module 240 may comprise a suitable one or more of the CPU 610, the secondary storage 620, the ROM 630, and the RAM 640, and the wireless-communication module 244 (in combination with the antenna 268) may comprise a suitable one or more of the network connectivity devices 660.

Figure 3:
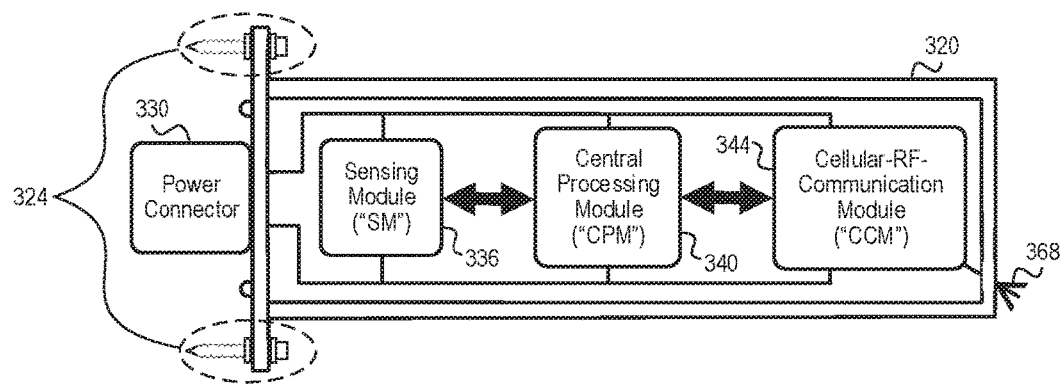
FIG. 3 depicts a layout for another radio-head-mounted sensor according to an embodiment of the disclosure.

FIG. 3 depicts a layout for the RHMS 300 according to an embodiment of the disclosure. The RHMS 300 is an MDT-channel-communicative sensor device that includes a housing 320, mounting hardware 324, the power connector 330, a sensing module 336, a central processing module 340, a cellular-RF-communication module 344, and a suitable antenna 368.

The housing 320 is configured to be securely attached to the RRH 140 (the RRH 140 is not depicted in FIG. 2, but see FIG. 1) by the mounting hardware 324. The housing 320 is also configured to meet or exceed National Electrical Manufacturers Association ("NEMA") level 4 electrical enclosure standards and to meet or exceed IEEE 1613 environmental and testing requirements. The housing 320 accommodates the sensing module 336, the central processing module 340, and the cellular-RF-communication module 344 such that the sensing module 336 may operably sense and/or observe one or more environmental conditions, parameters, characteristics, and/or other aspects of its surroundings. The power connector 330 is attached to the housing 320 such that power connector 330 may be operably coupled to the RRH 140 (the RRH 140 is not depicted in FIG. 2, but see FIG. 1). More particularly, the power connector 330 is attached to the housing 320 such that power connector 330 extends from the housing 320 as a male electrical coupling member (i.e., "an electrical plug"). The antenna 368 extends from the housing 320 such that the antenna 368 may operably transmit and receive cellular-RF-communication signals.

The sensing module 336 is communicatively coupled to the central processing module 340. The sensing module 336 is configured to sense and/or observe one or more environmental conditions, parameters, characteristics, and/or other aspects of its surroundings and is configured to transmit corresponding sensor data to the central processing module 340. The central processing module 340 is also communicatively coupled to the cellular-RF-communication module 344. The central processing module 340 is configured to operate as an interface between the sensing module 336 and the cellular-RF-communication module 344.

The cellular-RF-communication module 344 is communicatively coupled to the antenna 368. In the illustrated RHMS 300, the cellular-RF-communication module 344 is configured to transmit (through the antenna 368) the sensor data to the array antenna 136 (the array antenna 136 is not shown in FIG. 3, but see FIG. 1) over an MDT channel, and is configured to otherwise transmit and receive signals (through the antenna 368) to/from the array antenna 136 over an MDT channel according to one or more of a long term evolution ("LTE"), code division multiple access ("CDMA"), global system for mobile communication ("GSM"), worldwide interoperability for microwave access ("WiMAX") telecommunication, and/or one or more other suitable telecommunication protocols.

Additionally, the sensing module 336, the central processing module 340, and the RF-communication module 344 are operably coupled to the connector 330 to receive power through the connector 330, and are configured to operate using that power. Also, it should also be appreciated that the sensing module 336, the central processing module 340, and the RF-communication module 344 may be implemented using an embodiment of the computer system 600 (the computer system 600 is not depicted in FIG. 2, but see FIG. 6). For example, in such embodiments the sensing module 336 may comprise a suitable one or more of the I/O devices 650, the central processing module 340 may comprise a suitable one or more of the CPU 610, the secondary storage 620, the ROM 630, and the RAM 640, and the RF-communication module 344 (in combination with the antenna 368) may comprise a suitable one or more of the network connectivity devices 660.

Figure 4:
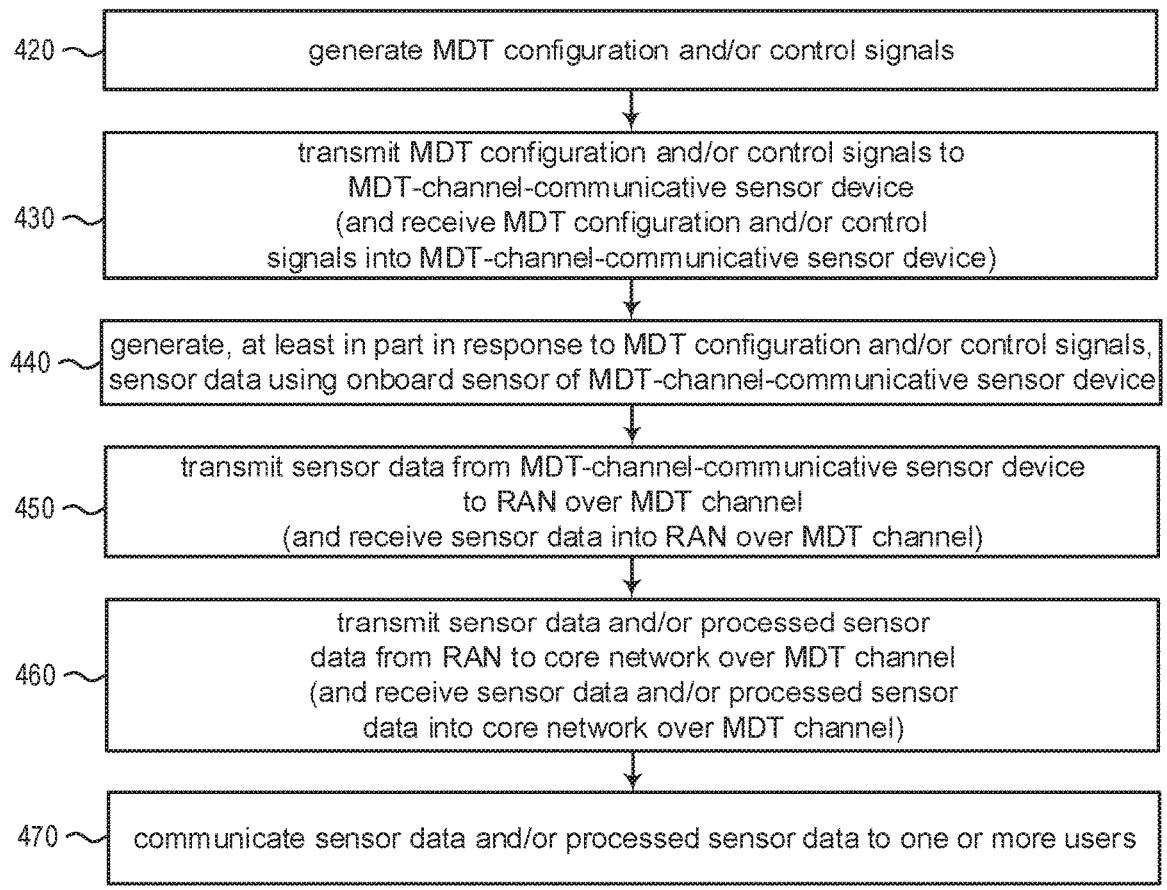
FIG. 4 is a flow chart of a method for sensing-data collection and transport according to an embodiment of the disclosure.

FIG. 4 is a flow chart of a method 400 for sensing-data collection and transport according to an embodiment of the disclosure. In some instances, the method 400 may be performed by the system 100 (see FIG. 1). Accordingly, the following description of the method 400 is made with reference to operations and components of the system 100. Nevertheless, it should be appreciated that the method 400 and/or any one or more of the particular steps of the method 400 may be performed by any other suitable device or system.

At step 420, the method 400 generates MDT configuration and/or control signals. For example, when using the system 100, in one instance the core network 116 and/or the BBU 144 may generate MDT configuration and/or control signals for directing the RHMS 300 or one of the UE 112 equipped with a CH4 concentration sensor to (as an Immediate MDT mode measurement) immediately sense and report the CH4 concentration of air around that UE 112. Such CH4 concentration data might be desirable, for example, when the core network 116 is informed or otherwise determines that an earthquake and/or a natural gas pipeline rupture has occurred in the vicinity of the cell site 120. In another instance, for example, the core network 116 and/or the BBU 144 may generate MDT configuration and/or control signals for directing the RHMS 300 or one of the UE 112 equipped with an $O_3$ concentration level sensor to (as a Logged MDT mode measurement) sense the $O_3$ concentration of air around that UE 112 and to store the $O_3$ data for later reporting. After step 420, the method 400 proceeds to step 430 (described further below).

At step 430, the method 400 transmits the MDT configuration and/or control signals (generated at step 420) to an MDT-channel-communicative sensor device (and the method 400 receives the MDT configuration and/or control signals into the MDT-channel-communicative sensor device). For example, when using the system 100, the cell site 120 may transmit the MDT configuration and/or control signals to a suitable one of the RHMS 300 or UE 112 (which may receive the signals). After step 430, the method 400 proceeds to step 440 (described further below).

At step 440, the method 400 generates, at least in part in response to the MDT configuration and/or control signals (transmitted and received at step 430), sensor data using an onboard sensor of the MDT-channel-communicative sensor device. For example, when using the system 100, one of the RHMS 300 or UE 112 that is equipped with an onboard CH4 concentration sensor and that has received MDT configuration and/or control signals directing that one of the RHMS 300 or UE 112 to immediately sense and report the CH4 concentration of air around that UE 112 may immediately generate CH4 data using the onboard CH4 concentration sensor. In another instance, for example, one of the RHMS 300 or UE 112 that is equipped with an onboard temperature sensor and that has received MDT configuration and/or control signals directing that one of the RHMS 300 or UE 112 to sense the temperature around that UE 112 and to store the temperature data for later reporting may generate temperature data using the onboard temperature sensor and may store the temperature data for later reporting. After step 440, the method 400 proceeds to step 450 (described further below).

At step 450, the method 400 transmits the sensor data (generated at step 440) from the MDT-channel-communicative sensor device to a RAN over an MDT channel (and the method 400 receives the sensor data into the RAN over the MDT channel). For example, when using the system 100, one of the RHMS 300 or UE 112 that has generated the sensor data may transmit (over an MDT channel) the sensor data to the cell site 120 (which may receive the sensor data over the MDT channel). After step 450, the method 400 proceeds to step 460 (described further below).

At step 460, the method 400 transmits the sensor data and/or processed sensor data from the RAN to a core network over the MDT channel (and the method 400 receives the sensor data and/or the processed sensor data into the core network over the MDT channel). For example, when using the system 100, BBU 144 may transmit (over the MDT channel) the sensor data and/or processed sensor data to a TCE and/or one or more other suitable components of the core network 116 (which may receive the data over the MDT channel). After step 460, the method 400 proceeds to step 470 (described further below).

At step 470, the method 400 communicates the sensor data and/or processed sensor data to one or more users. For example, when using the system 100, a TCE and/or one or more other suitable components of the core network 116 may transmit the sensor data and/or processed sensor data to the one or more public and/or private networks 160, which in turn may transmit the sensor data and/or processed sensor data to the one or more user devices 168, which in turn may display the sensor data and/or processed sensor data to one or more users (and/or otherwise inform one or more users of the sensor data). In another instance, for example, the core network 116 may transmit the sensor data and/or processed sensor data to the cell site 120, which may in turn transmit the sensor data and/or processed sensor to one or more of the UE 112, which in turn may display the sensor data and/or processed sensor data to one or more users (and/or otherwise inform one or more users of the sensor data).

Figure 5:
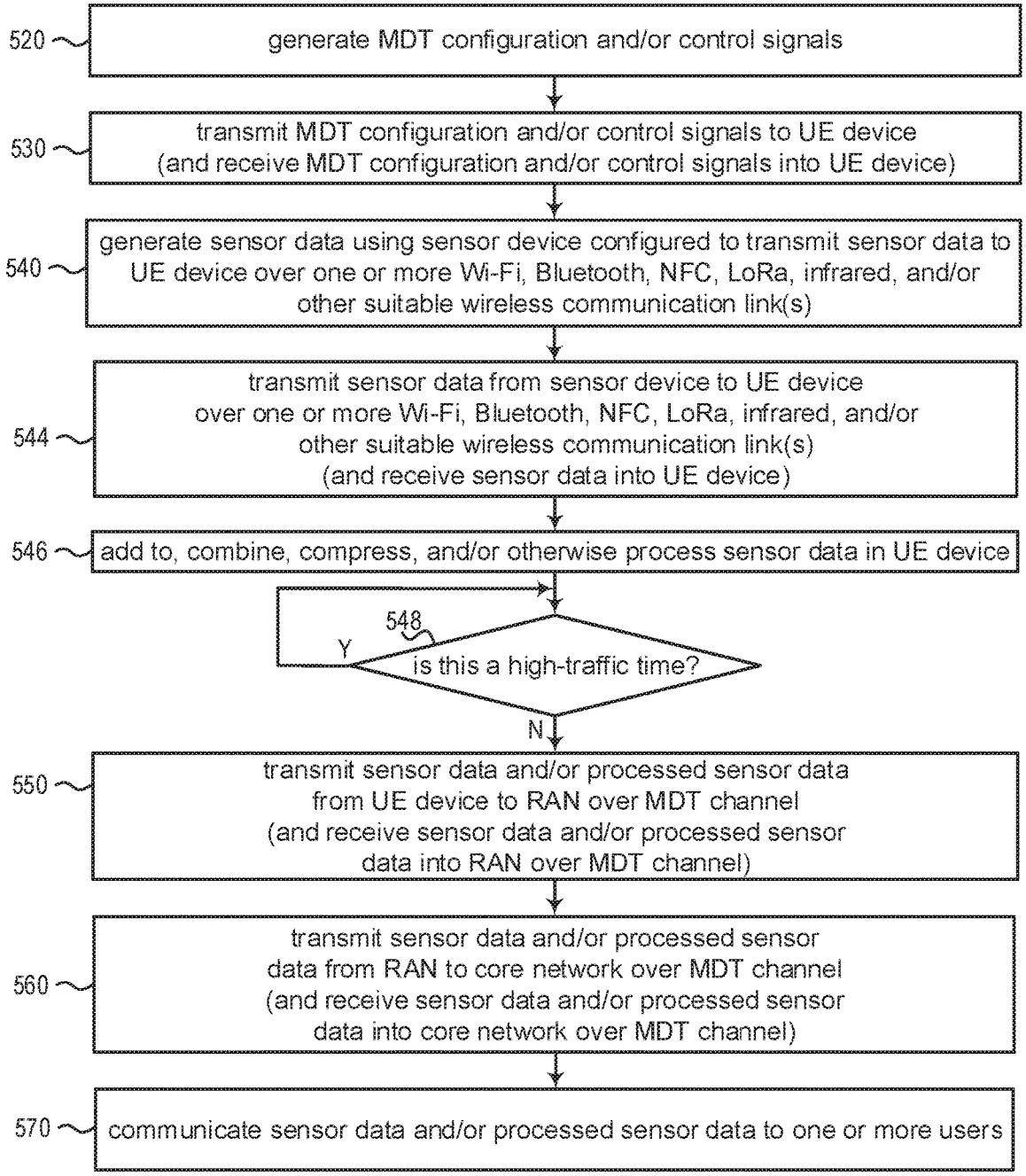
FIG. 5 is a flow chart of another method for sensing-data collection and transport according to an embodiment of the disclosure.

FIG. 5 is a flow chart of a method 500 for sensing-data collection and transport according to an embodiment of the disclosure. In some instances, the method 500 may be performed by the system 100 (see FIG. 1). Accordingly, the following description of the method 500 is made with reference to operations and components of the system 100. Nevertheless, it should be appreciated that the method 500 and/or any one or more of the particular steps of the method 500 may be performed by any other suitable device or system.

At step 520, the method 500 generates MDT configuration and/or control signals in a like manner as step 420 of the method 400 (described above). After step 520, the method 500 proceeds to step 530 (described further below).

At step 530, the method 500 transmits the MDT configuration and/or control signals (generated at step 520) to a UE device (and the method 500 receives the MDT configuration and/or control signals into the UE device) in a like manner as step 430 of the method 400 (described above). After step 530, the method 500 proceeds to step 540 (described further below).

At step 540, the method 500 generates sensor data using a sensor device configured to transmit the sensor data to the UE device over one or more Wi-Fi, Bluetooth, NFC, LoRa, infrared, and/or other suitable wireless communication link(s). For example, when using the system 100, one of the ALS 152 or the RHMS 200 generates sensor data. After step 540, the method 500 proceeds to step 544 (described further below).

At step 544, the method 500 transmits the sensor data (generated at step 540) from the sensor device to the UE device over one or more Wi-Fi, Bluetooth, NFC, LoRa, infrared, and/or other suitable wireless communication link(s) (and the method 500 receives the sensor data into the UE device). For example, when using the system 100, one of the ALS 152 or the RHMS 200 that generates the sensor data also transmits the sensor data to the one of the UE 112 over one or more Wi-Fi, Bluetooth, NFC, LoRa, infrared, and/or other suitable wireless communication link(s). After step 544, the method 500 proceeds to step 550 (described further below).

At step 546, the method 500 adds to, combines, compresses, and/or otherwise processes the sensor data (generated at step 540 and transmitted to the UE device at step 544) in the UE device. For example, when using the system 100, the one of the UE 112 may combine sensor data from a plurality of sensors into average data and then discard the individual data, thereby effectively reducing the overall volume or amount of data for (ultimate) transport over the MDT channel, or the UE 112 may apply one or more mathematical formulas, algorithms, and/or other transformations to processes one or more types of data into other data (e.g., temperature data and humidity data may be combined to generate dew point data), or the UE 112 may add geographic, temporal, and/or other data generated by the UE 112 to the sensor data, and/or the UE 112 may apply data compression techniques to compress the sensor data and/or the processed sensor data, thereby effectively reducing the overall volume or amount of data for (ultimate) transport over the MDT channel. After step 546, the method 500 proceeds to step 548 (described further below).

At step 548, the method 500 buffers the sensor data and/or processed sensor data during "high-traffic" times (e.g., during voice communication sessions and/or other relatively high layer processes), thereby reducing (or, in some embodiments, completely avoiding) layer 7 transmissions of the sensor data and/or the processed sensor data over the MDT channel, so as to mitigate consumption of bandwidth desired for supporting the higher priority operations. For example, when using the system 100, when the one of the UE 112 determines that it is indeed operating during a high-traffic time, then the method 500 does not proceed, but when the UE 112 determines that it is not operating during a high-traffic time, then the method 500 does proceed. After step 548, the method 500 proceeds to step 550 (described further below).

At step 550, the method 500 transmits the sensor data and/or processed sensor data from the UE device to a RAN over an MDT channel (and the method 500 receives the sensor data into the RAN over the MDT channel) in a like manner as step 450 of the method 400 (described above). After step 550, the method 500 proceeds to step 560 (described further below).

At step 560, the method 500 transmits the sensor data and/or processed sensor data from the RAN to a core network over the MDT channel (and the method 500 receives the sensor data and/or the processed sensor data into the core network over the MDT channel) in a like manner as step 460 of the method 400 (described above). After step 560, the method 500 proceeds to step 570 (described further below).

At step 570, the method 500 communicates the sensor data and/or processed sensor data to one or more users in a like manner as step 470 of the method 400 (described above).

Figure 6:
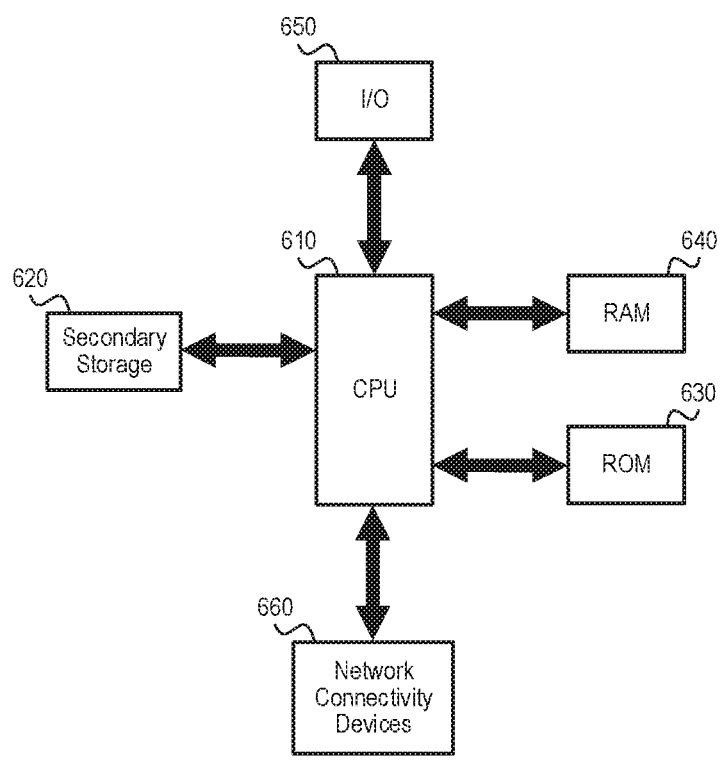
FIG. 6 is a block diagram of a computer system suitable for implementing one or more embodiments disclosed herein.

FIG. 6 is a block diagram of a computer system 600 suitable for implementing one or more embodiments disclosed herein. The computer system 600 includes a processor 610 (which may be referred to as a "central processor unit," "central processing unit," or "CPU") that is in communication with memory devices including secondary storage 620, read only memory ("ROM") 630, random access memory ("RAM") 640, input/output ("I/O") devices 650, and network connectivity devices 660. The processor 610 may be implemented as one or more integrated circuit ("IC") chips. It is understood that by programming and/or loading executable instructions onto the computer system 600, at least one of the CPU 610, the RAM 640, and the ROM 630 are changed, transforming the computer system 600 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit ("ASIC"), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the computer system 600 is turned on or booted, the CPU 610 may execute a computer program or application. For example, the CPU 610 may execute software or firmware stored in the ROM 630 or stored in the RAM 640. In some cases, on boot and/or when the application is initiated, the CPU 610 may copy the application or portions of the application from the secondary storage 620 to the RAM 640 or to memory space within the CPU 610 itself, and the CPU 610 may then execute instructions that the application is comprised of. In some cases, the CPU 610 may copy the application or portions of the application from memory accessed via the network connectivity devices 660 or via the I/O devices 650 to the RAM 640 or to memory space within the CPU 610, and the CPU 610 may then execute instructions that the application is comprised of. During execution, an application may load instructions into the CPU 610, for example load some of the instructions of the application into a cache of the CPU 610. In some contexts, an application that is executed may be said to configure the CPU 610 to do something, e.g., to configure the CPU 610 to perform the function or functions promoted by the subject application. When the CPU 610 is configured in this way by the application, the CPU 610 becomes a specific purpose computer or a specific purpose machine.

The secondary storage 620 is typically comprised of one or more disk drives or tape drives and is used for non-volatile storage of data and as an over-flow data storage device if RAM 640 is not large enough to hold all working data. Secondary storage 620 may be used to store programs which are loaded into RAM 640 when such programs are selected for execution. The ROM 630 is used to store instructions and perhaps data which are read during program execution. ROM 630 is a non-volatile memory device which typically has a small memory capacity relative to the larger memory capacity of secondary storage 620. The RAM 640 is used to store volatile data and perhaps to store instructions. Access to both ROM 630 and RAM 640 is typically faster than to secondary storage 620. The secondary storage 620, the RAM 640, and/or the ROM 630 may be referred to in some contexts as computer readable storage media and/or non-transitory computer readable media.

The I/O devices 650 may include digital sensors, printers, video monitors, liquid crystal displays ("LCDs"), touch screen displays, keyboards, keypads, switches, dials, mice, track balls, voice recognizers, card readers, paper tape readers, and/or other well-known input devices and/or other well-known output devices. Non-limiting examples of digital sensors include those marketed by Sensirion Inc., 11 East Adams, Suite 220, Chicago, Ill. 60603, at www.sensirion.com (a copy of this web page has been archived on the Wayback Machine, https://web.archive.org/), and RF Explorer 3G+IoT modules (manufactured by Seeed Technology Co., Ltd) marketed by Digi-Key Electronics at https://www.digikey.com/catalog/en/partgroup/rf-explorer-3g-iot-shield-for-arduino/65956?mpart=114990813&vendor=1597 (a copy of this web page has been archived on the Wayback Machine, https://web.archive.org/).

The network connectivity devices 660 may take the form of modems, modem banks, Ethernet cards, universal serial bus ("USB") interface cards, serial interfaces, token ring cards, fiber distributed data interface ("FDDI") cards, wireless local area network ("WLAN") cards, radio transceiver cards that promote radio communication using protocols such as code division multiple access ("CDMA"), global system for mobile communication ("GSM"), long-term evolution ("LTE"), worldwide interoperability for microwave access ("WiMAX"), near field communication ("NFC"), radio frequency identity ("RFID"), and/or other air interface protocol radio transceiver cards, and other well-known network devices. These network connectivity devices 660 may enable the processor 610 to communicate with the Internet or one or more intranets. With such a network connection, it is contemplated that the processor 610 might receive information from the network, or might output information to the network in the course of performing the method steps described herein. Such information, which is often represented as a sequence of instructions to be executed using processor 610, may be received from and outputted to the network, for example, in the form of a computer data signal embodied in a carrier wave.

Such information, which may include data or instructions to be executed using processor 610 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embodied in the carrier wave may be referred to in some contexts as a transitory signal.

The processor 610 executes instructions, codes, computer programs, scripts which it accesses from hard disk, floppy disk, optical disk (these various disk based systems may all be considered secondary storage 620), flash drive, ROM 630, RAM 640, or the network connectivity devices 660. While only one processor 610 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 620, for example, hard drives, floppy disks, optical disks, and/or other device, the ROM 630, and/or the RAM 640 may be referred to in some contexts as non-transitory instructions and/or non-transitory information.

In an embodiment, the computer system 600 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 600 to provide the functionality of a number of servers that is not directly bound to the number of computers in the computer system 600. For example, virtualization software may provide twenty virtual servers on four physical computers. In an embodiment, the functionality disclosed herein may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed herein may be provided as a computer program product. The computer program product may comprise one or more computer readable storage medium having computer usable program code embodied therein to implement the functionality disclosed herein. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory ("CD-ROM") disks, floppy disks, jump drives, digital cards, multimedia cards, and others. The computer program product may be suitable for loading, by the computer system 600, at least portions of the contents of the computer program product to the secondary storage 620, to the ROM 630, to the RAM 640, and/or to other non-volatile memory and volatile memory of the computer system 600. The processor 610 may process the executable instructions and/or data structures in part by directly accessing the computer program product, for example by reading from a CD-ROM disk inserted into a disk drive peripheral of the computer system 600. Alternatively, the processor 610 may process the executable instructions and/or data structures by remotely accessing the computer program product, for example by downloading the executable instructions and/or data structures from a remote server through the network connectivity devices 660. The computer program product may comprise instructions that promote the loading and/or copying of data, data structures, files, and/or executable instructions to the secondary storage 620, to the ROM 630, to the RAM 640, and/or to other non-volatile memory and volatile memory of the computer system 600.

In some contexts, the secondary storage 620, the ROM 630, and the RAM 640 may be referred to as a non-transitory computer readable medium or a computer readable storage media. A dynamic RAM embodiment of the RAM 640, likewise, may be referred to as a non-transitory computer readable medium in that while the dynamic RAM receives electrical power and is operated in accordance with its design, for example during a period of time during which the computer system 600 is turned on and operational, the dynamic RAM stores information that is written to it. Similarly, the processor 610 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for providing data to a user, the method comprising:
   communicating, from a radio access network to a first cellular-communicative UE device, at least one MDT signal selected from the group consisting of an MDT configuration signal and an MDT control signal;
   receiving sensor data comprising non-MDT data into the first cellular-communicative UE device over at least one wireless communication link selected from the group consisting of a Wi-Fi link, a Bluetooth link, an NFC link, a LoRa link, and an infrared link;
   determining by the first cellular-communicative UE device that a voice communication session between the first cellular-communicative UE device and the radio access network is occurring over a cellular connection prior to transmitting any of the sensor data;
   in response to the determination, buffering the sensor data in the first cellular-communicative UE device during the voice communication session;
   after the voice communication session and in response to a determination that the first cellular-communicative UE device is not engaged in any other cellular communication sessions, communicating at least a portion of the sensor data from the first cellular-communicative UE device to the radio access network over an MDT channel; and
   communicating at least the portion of the sensor data from the radio access network to the user.

2. The method of claim 1, wherein communicating at least the portion of the sensor data from the radio access network to the user includes communicating at least the portion of the sensor data to a core network.

3. The method of claim 1, wherein communicating at least the portion of the sensor data from the radio access network to the user includes communicating at least the portion of the sensor data to the first cellular-communicative UE device.

4. The method of claim 1, wherein communicating at least the portion of the sensor data from the radio access network to the user includes communicating at least the portion of the sensor data to a second cellular-communicative UE device.

5. The method of claim 1, wherein receiving the sensor data into the first cellular-communicative UE device includes receiving the sensor data into the first cellular-communicative UE device from a radio-head-mounted sensor device.

6. The method of claim 1, wherein receiving the sensor data into the first cellular-communicative UE device includes receiving the sensor data into the first cellular-communicative UE device from an Internet of Things device.

7. The method of claim 1, further comprising:
   generating, in the first cellular-communicative UE device, processed sensor data based on the sensor data,
   wherein buffering the sensor data in the first cellular-communicative UE device during the voice communication session comprises buffering the processed sensor data in the first cellular-communicative UE device during the voice communication session,
   wherein an overall volume of the processed sensor data is less than an overall volume of the sensor data,
   wherein communicating the at least one MDT signal from the radio access network to the first cellular-communicative UE device includes communicating the at least one MDT signal from a cell site to the first cellular-communicative UE device,
   wherein communicating at least the portion of the sensor data from the first cellular-communicative UE device to the radio access network over the MDT channel includes communicating the processed sensor data from the first cellular-communicative UE device to a cell site over the MDT channel after the voice communication session, and
   wherein communicating at least the portion of the sensor data from the radio access network to the user includes communicating the processed sensor data from a cell site to a user-communication device.

8. A system for providing data to a user, the system comprising:
   a radio access network configured to receive, over an MDT channel, sensor data comprising non-MDT data;
   a sensor device communicatively coupled to the radio access network configured to generate the sensor data; and
   a cellular-communicative UE device comprising a processor, the cellular-communicative UE device configured to:

receive, from the radio access network, at least one MDT signal selected from the group consisting of an MDT configuration signal and an MDT control signal, receive the sensor data from the sensor device over at least one wireless communication link selected from the group consisting of a Wi-Fi link, a Bluetooth link, an NFC link, a LoRa link, and an infrared link, determine that a voice communication session between the cellular-communicative UE device and the radio access network is occurring over a cellular connection prior to transmitting any of the sensor data, in response to the determination, buffer the sensor data in the cellular-communicative UE device during the voice communication session, and after the voice communication session and in response to a determination that the cellular-communicative UE device is not engaged in any other cellular communication sessions, communicate at least a portion of the sensor data to the radio access network over the MDT channel, wherein at least the portion of the sensor data is communicated from the radio access network to the user.

9. The system of claim 8, wherein the sensor device comprises a radio-head-mounted sensor device.

10. The system of claim 9, wherein the radio-head-mounted sensor device includes an Internet of Things device.

11. The system of claim 8, wherein the cellular-communicative UE device includes at least one mobile device selected from the group consisting of a mobile phone, a smart phone, and a personal digital assistant.

12. The system of claim 8, wherein the radio access network includes a cell site and the sensor device is communicatively coupled to the cell site.

13. The system of claim 8, wherein the sensor device comprises an Internet of Things device.

* * * * *